United States Patent
Staudt et al.

(10) Patent No.: US 6,899,471 B2
(45) Date of Patent: May 31, 2005

(54) SLEEVE SPLICING KIT AND METHOD

(75) Inventors: Eric K. Staudt, Jeffersonville, PA (US); Benjamin B. James, Birchrunville, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/844,670

(22) Filed: May 13, 2004

(65) Prior Publication Data

US 2004/0247260 A1 Dec. 9, 2004

Related U.S. Application Data

(60) Provisional application No. 60/469,925, filed on May 13, 2003.

(51) Int. Cl.[7] .............................................. G02B 6/255
(52) U.S. Cl. .......................................... 385/99; 385/95
(58) Field of Search ...................................... 385/95–99

(56) References Cited

U.S. PATENT DOCUMENTS 4,896,904 A * 1/1990 Gadsden et al. ......... 285/381.5
5,636,551 A * 6/1997 Davidson et al. .......... 74/502.5
5,755,465 A * 5/1998 Stewart et al. ........... 285/381.5

* cited by examiner

Primary Examiner—Brian Healy
Assistant Examiner—Derek L. Dupuis
(74) Attorney, Agent, or Firm—Synnestvedt & Lechner LLP

(57) ABSTRACT

A kit and a method for splicing together porous sleeves are disclosed. The kit includes a release liner in the form of a non-porous membrane, preferably in the shape of an elongated tube. Adhesive and an adhesive applicator may also be included. The method includes the steps of inserting the release liner within an end of a first sleeve and then inserting that sleeve end into the end of a second sleeve. The outer surface of the first sleeve engages the inner surface of the second sleeve and defines an engagement zone having a predetermined length. The release liner extends along the engagement zone. Adhesive is applied to the outer surface of the second sleeve. The adhesive penetrates the second sleeve and bonds it to the first sleeve. The release liner acts as a barrier preventing the adhesive from bonding the first sleeve closed at the splice.

20 Claims, 12 Drawing Sheets

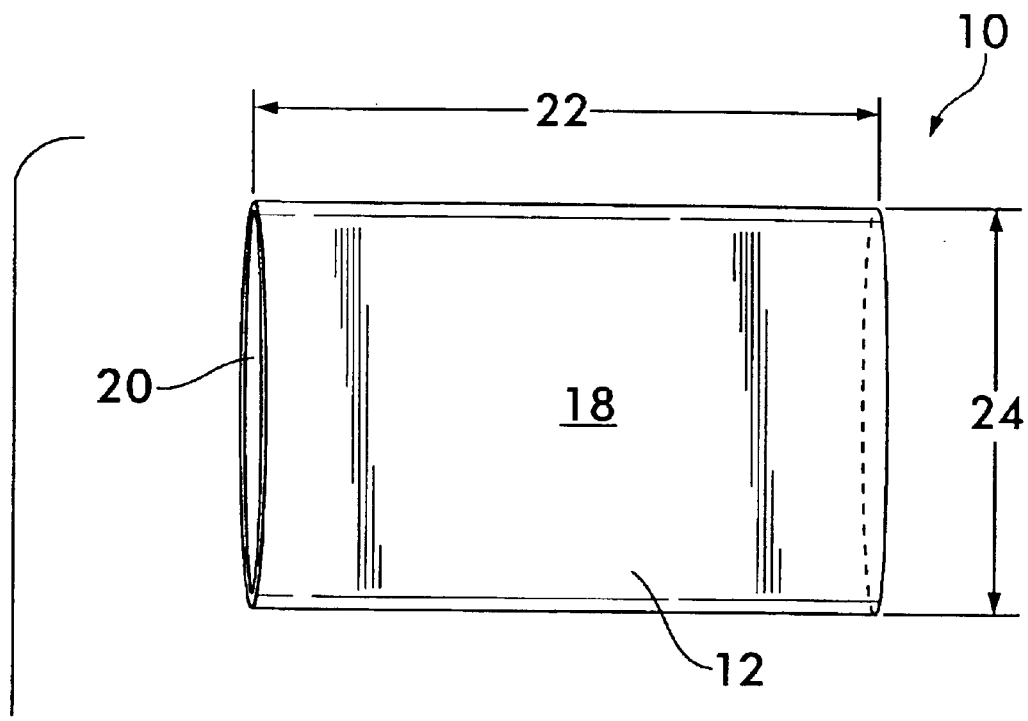
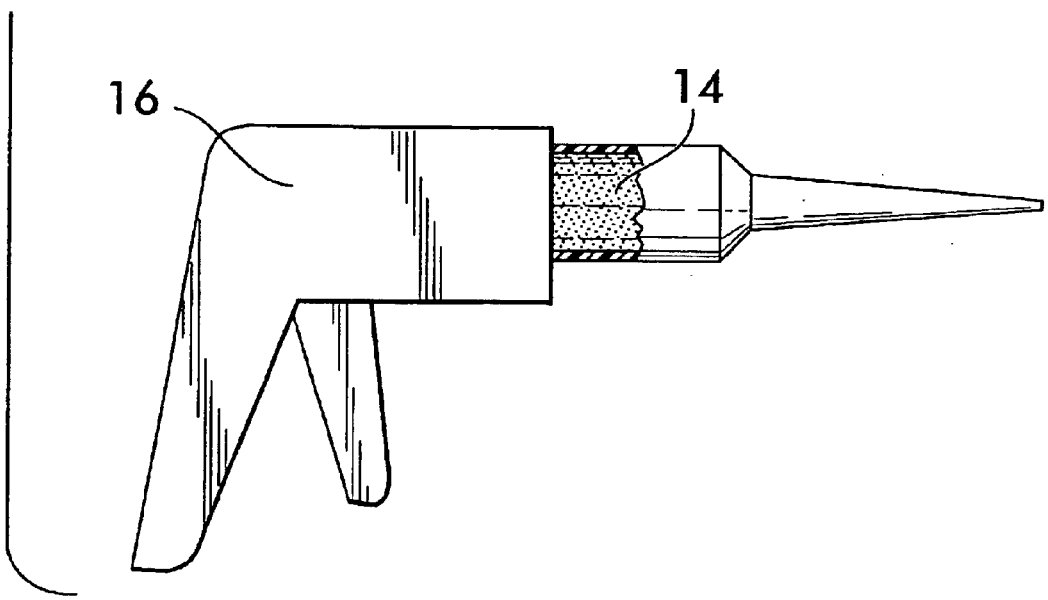
FIG.1

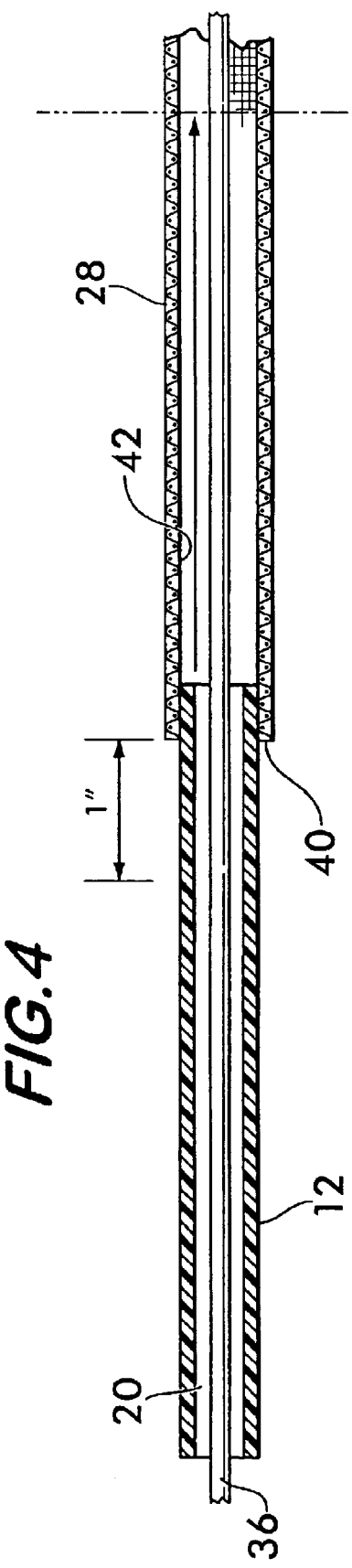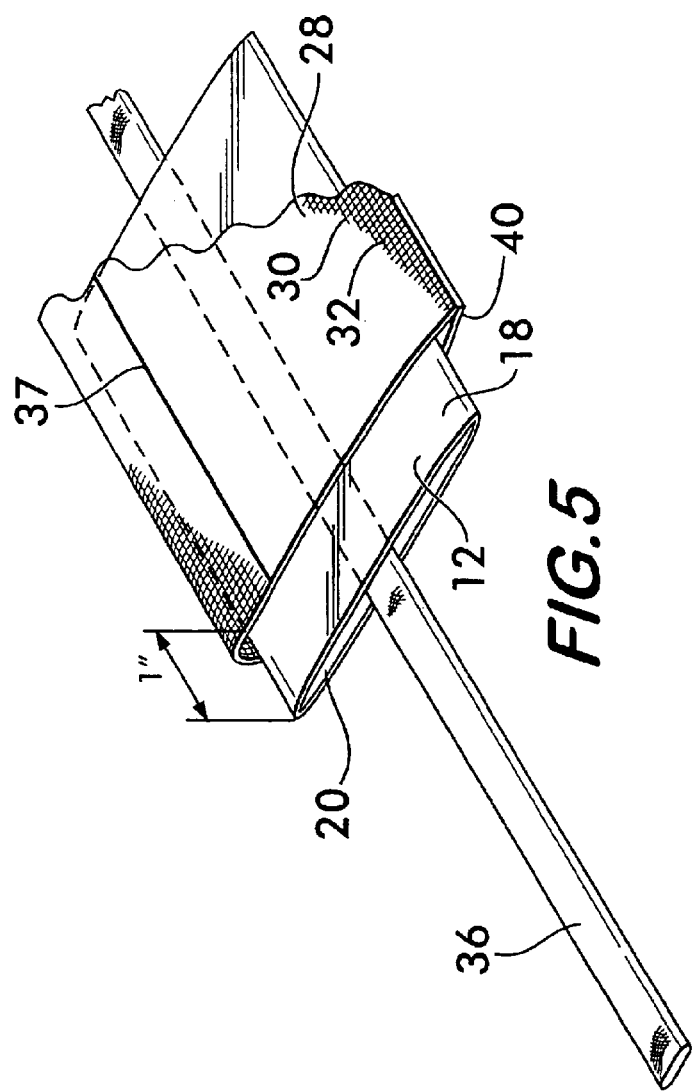

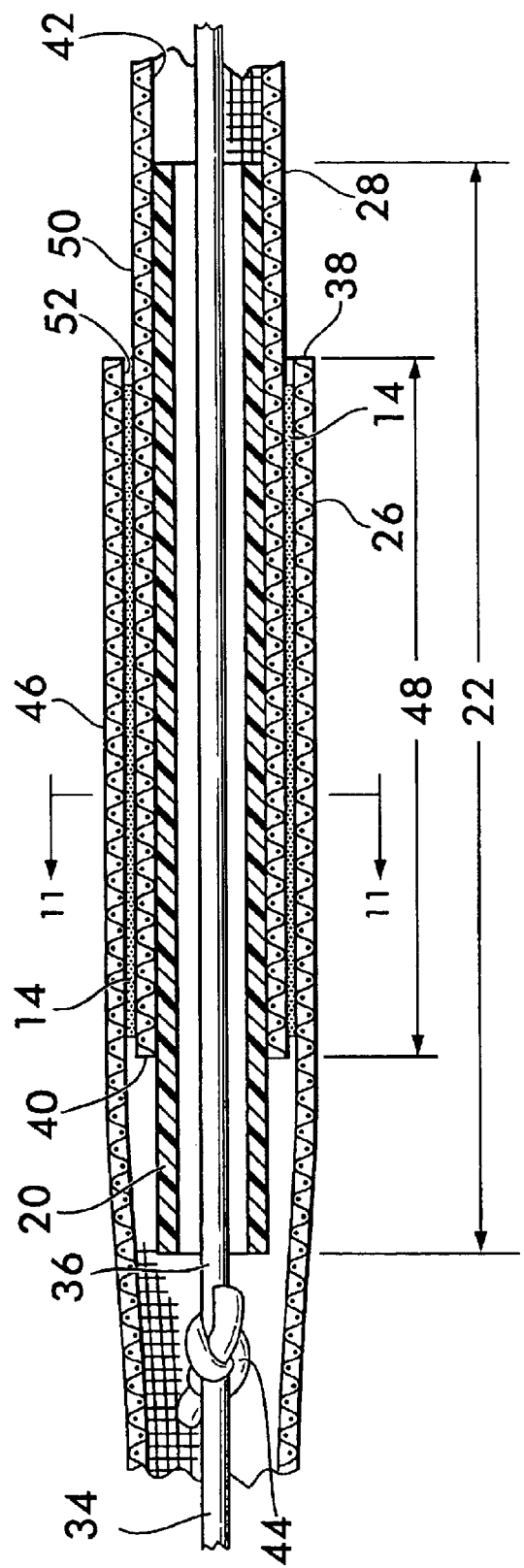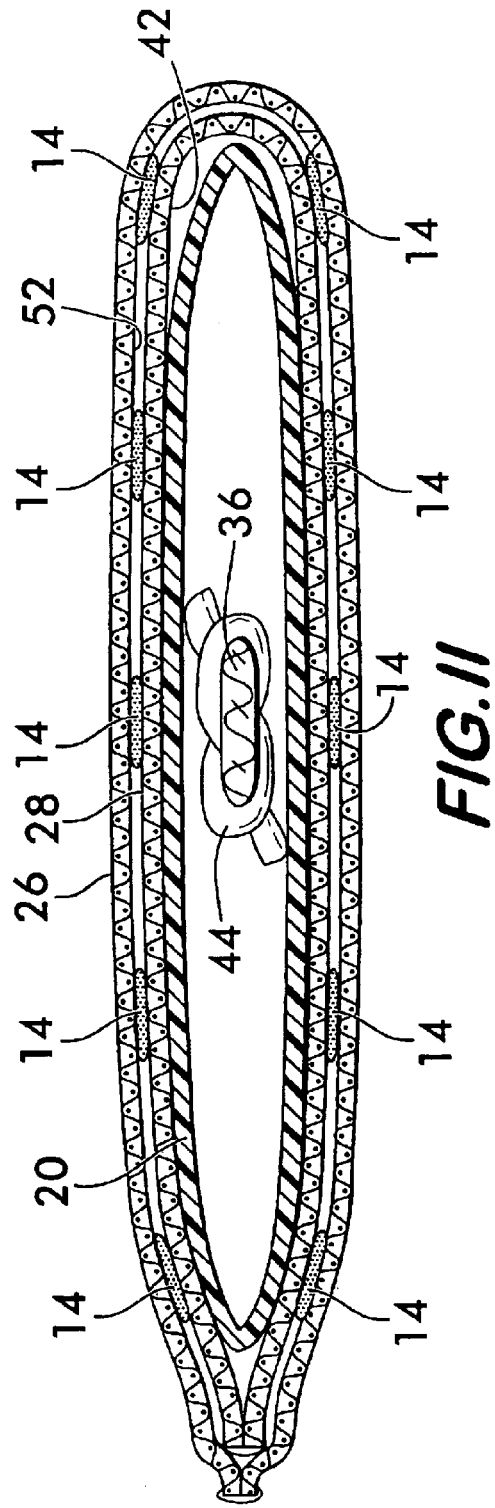

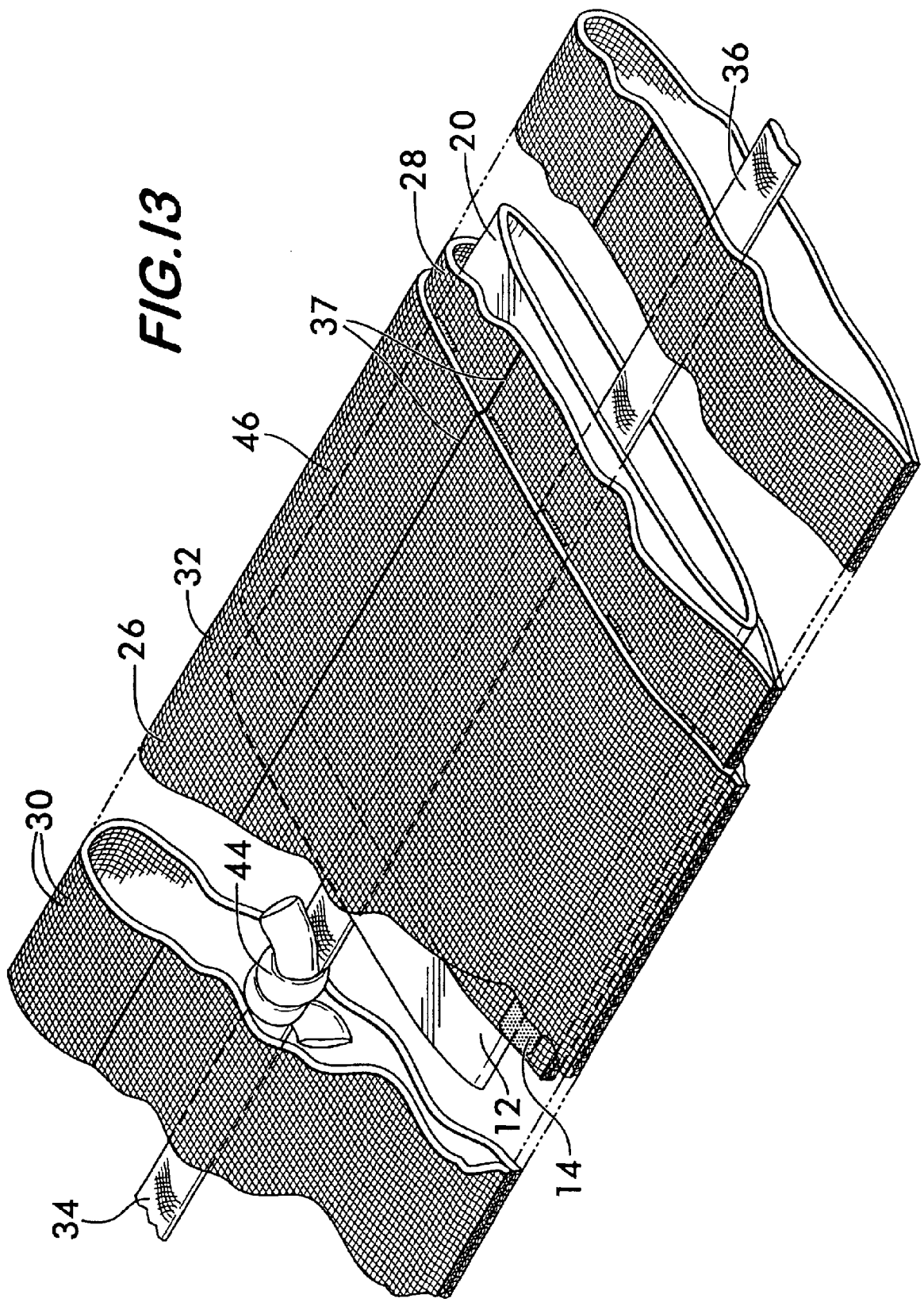

SLEEVE SPLICING KIT AND METHOD

CROSS-REFERENCE TO RELATED APPLICATION

This application is based upon and claims priority to provisional U.S. Application No. 60/469,925 filed May 13, 2003.

FIELD OF THE INVENTION

This invention relates to a method for splicing sleeves together end to end and a kit for effecting the splice.

BACKGROUND OF THE INVENTION

Elongated items such as wiring bundles or optical cable used for communications networks, power transmission and the like are often installed in protective ducts which may be buried underground, strung from support stanchions or positioned within building structures along with other utility and service lines. Such ducts are often flexible extruded polymer tubes which provide substantially continuous protection to the elongated items from moisture, abrasion, impact and other environmental hazards.

It is found advantageous to ensheath the elongated items within flexible protective sleeves that are pre-positioned within the ducts. Protective sleeves help separate the various items from one another within a duct and organize them to obtain increased efficiency of use of the limited duct space. The sleeves also protect the elongated items from abrasion caused when additional elongated items are drawn through ducts already populated by other elongated items.

The sleeves are preferably woven from tough polymer monofilaments allowing them to withstand relatively high tensile forces encountered when they are drawn through the ducts over lengths of a mile or longer. Several such protective sleeves are preferably installed in a duct. To conserve space within the duct, and also to facilitate drawing of the sleeve through it, the sleeves are installed in a flat or collapsed configuration. The sleeves are flexible however, and expand outwardly to accommodate the elongated items drawn through them. Each sleeve initially has a high strength pull tape within it. When it is desired to install an elongated item within the duct, the item is attached to one end of a pull tape of one of the sleeves and the pull tape is drawn through the sleeve (the sleeve being held within the duct), drawing the item with it.

In view of the significant lengths that ducts may reach, it is necessary to have the capability of splicing the protective sleeving end to end to ensure that the length of the sleeving exceeds the length of the duct. It is desirable that the splice have a tensile strength equal to or greater than the tensile strength of the sleeve itself to avoid the splice forming a weak link where the sleeve might tend to separate when subjected to tensile force during a pull through a duct. Alternately, the splice should have a tensile strength that exceeds the tension experienced by the sleeve during a pull through a duct. In any event, the splice must not inhibit the ability of the sleeve to expand and accommodate an elongated item, nor should it inhibit the motion of the pull tape through the sleeve.

SUMMARY OF THE INVENTION

The invention concerns a kit for adhesively splicing porous sleeves together end to end using a flowable adhesive. To effect the splice, a portion of one end of one sleeve is positioned within one end of a second sleeve. This brings an outer surface of the one sleeve into engagement with an inner surface of the second sleeve over a predetermined length. The adhesive bonds the sleeves to one another substantially within a zone defined by the predetermined length. The kit comprises a non-porous, flexible membrane. The membrane is positionable within the one sleeve and extends substantially over the predetermined length. The membrane serves as a barrier to prevent the adhesive from penetrating through the one sleeve. This avoids bonding the sleeves closed at the splice. Preferably, the membrane comprises an elongated tube sized to fit substantially within the one sleeve.

The invention also includes a method of splicing an end of a first porous sleeve to an end of a second porous sleeve. The method comprises the steps of:

(A) providing a non-porous membrane;

(B) inserting the membrane within the end of the first porous sleeve;

(C) inserting the end of the first porous sleeve within the end of the second porous sleeve thereby engaging an outer surface of the first sleeve with an inner surface of the second sleeve in a zone extending over a predetermined length; and (D) applying adhesive between the first and second sleeves throughout the zone over a region overlying the membrane, the adhesive adhering the first and second sleeves to one another, the adhesive not penetrating the non-porous membrane.

The method may further include the step of applying pressure over the region to which adhesive is applied.

When the sleeves are used to protect elongated items within a duct, they will have a pull tape positioned within them to facilitate placement of the elongated item within the sleeve. At the splice, each sleeve will have a respective pull tape, and the pull tapes must be joined to one another at the splice. This entails the addition of the steps of joining the pull tape of one sleeve to the pull tape of the other sleeve and positioning the membrane between at least one of the pull tapes and the region over which adhesive is applied to ensure that the pull tape is not adhered to one of the sleeves by the adhesive.

The invention also includes a protective sleeve comprising a first segment formed of a plurality of interlaced filamentary members, the first segment having a first open end. A non-porous, flexible membrane is positioned within the first open end of the first segment. A second segment is formed of a plurality of interlaced filamentary members. The second segment has a second open end. The first open end of the first segment is positioned within the second open end such that an outwardly facing surface of the first segment engages an inwardly facing surface of the second segment over a predetermined length of the segments. An adhesive is deposited between the outwardly and the inwardly facing surfaces. The adhesive is confined to a region defined by the membrane and bonds the segments to one another.

BRIEF DESCRIPTION OF THE DRAWINGS

FIG. 1 depicts the items comprising a kit for splicing protective sleeve segments according to the invention;

FIGS. 2–12 illustrate steps for splicing protective sleeve segments according to the invention wherein:

FIG. 4 is a longitudinal sectional view taken at line 4—4 of FIG. 3;

FIG. 10 is a longitudinal sectional view taken at line 10—10 of FIG. 9;

FIG. 11 is a cross sectional view taken at line 11—11 of FIG. 10; and

FIG. 13 illustrates a protective sleeve formed from two sleeve segments spliced together.

DETAILED DESCRIPTION OF THE PREFERRED EMBODIMENTS

Figure 2:
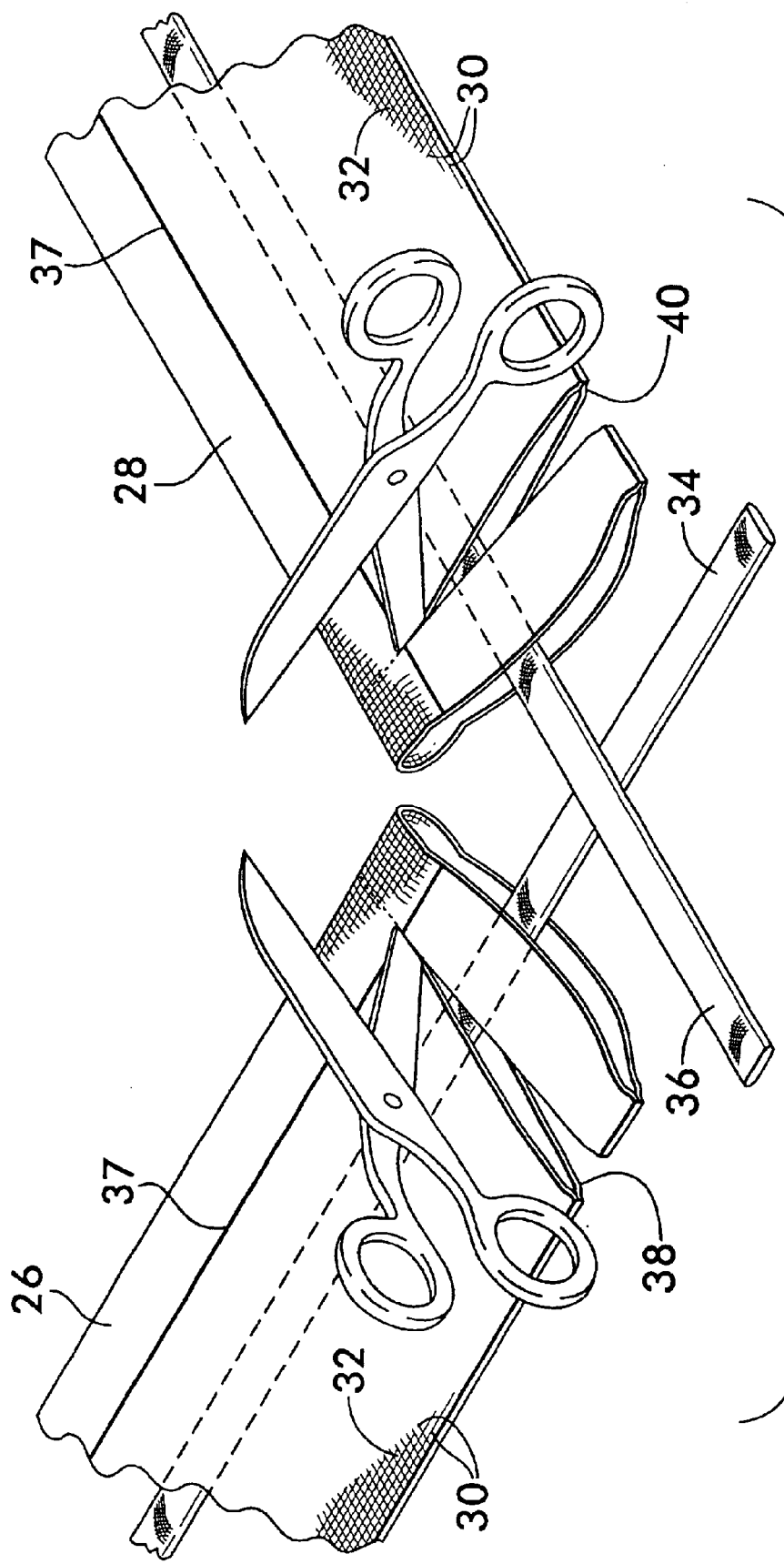

FIG. 1 illustrates a kit 10 for splicing protective sleeve segments together end to end. Kit 10 preferably comprises a release liner 12, adhesive 14 and an adhesive applicator 16.

Release liner 12 comprises a substantially non-porous, flexible membrane 18 preferably formed in the shape of an elongated tube 20. Tube 20 has a length 22 and a width 24 and is sized to fit substantially within a protective sleeve as described below. Other forms of release liner 12 are feasible, for example, a simple flat sheet or a sheet having a reverse fold providing two back to back layers. The material comprising the release liner is substantially non-porous so as to act as a barrier and not allow the adhesive 14 to pass through it. Preferred materials include synthetic resins such as polyethylene, polyethylene terepthalate and polytetrafluoroethylene as well as other polymer materials such as polypropylene or other polyolefins. It is further preferred that the adhesive 14 not bond to the release liner 12.

The method of splicing protective sleeve segments together according to the invention is shown in FIGS. 2–12. With reference to FIG. 2, two sleeve segments 26 and 28 to be joined are preferably formed of interlaced filamentary members 30. The filamentary members may be monofilaments formed of polymers such as nylon, polyester, polyethylene, polypropylene and polytetrafluoroethylene. Interlacing is preferably by weaving and the interstices 32 of the weave impart a porosity to the sleeve segments 26 and 28 that allows them to be adhesively bonded as described below. The splicing method is not limited to woven sleeves, however, as other forms of porous sleeve may also be spliced using the techniques described herein.

Sleeve segments 26 and 28 are flexible and resiliently biased into a flat configuration. This configuration facilitates drawing the sleeves through a duct and conserves space therein. The sleeves expand outwardly to accommodate an elongated item.

Sleeve segments 26 and 28 also have respective pull tapes 34 and 36 that must be joined together before the sleeve segments are spliced. The pull tapes allow an elongated item to be drawn through the protective sleeve once the sleeve is installed in a duct, as described above. Additionally, sleeve segments 26 and 28 may each have visible identifiers extending along their lengths. Preferably, the identifiers are in the form of color-coded lines 37 that allow various sleeves to be differentiated from one another at opposite ends of a duct.

A splice may be made during installation of one or more protective sleeves within a duct. For example, if the length of protective sleeve segment 26 is insufficient to extend through an entire duct, then drawing of the sleeve segment 26 through the duct will be halted before its end 38 is drawn into the duct, and the end 40 of sleeve segment 28 is spliced to end 38. The draw into the duct of the protective sleeve, now comprising segments 26 and 28, is resumed, and the splicing may be repeated as necessary until the protective sleeve has sufficient length to extend through the entire duct.

Figure 3:
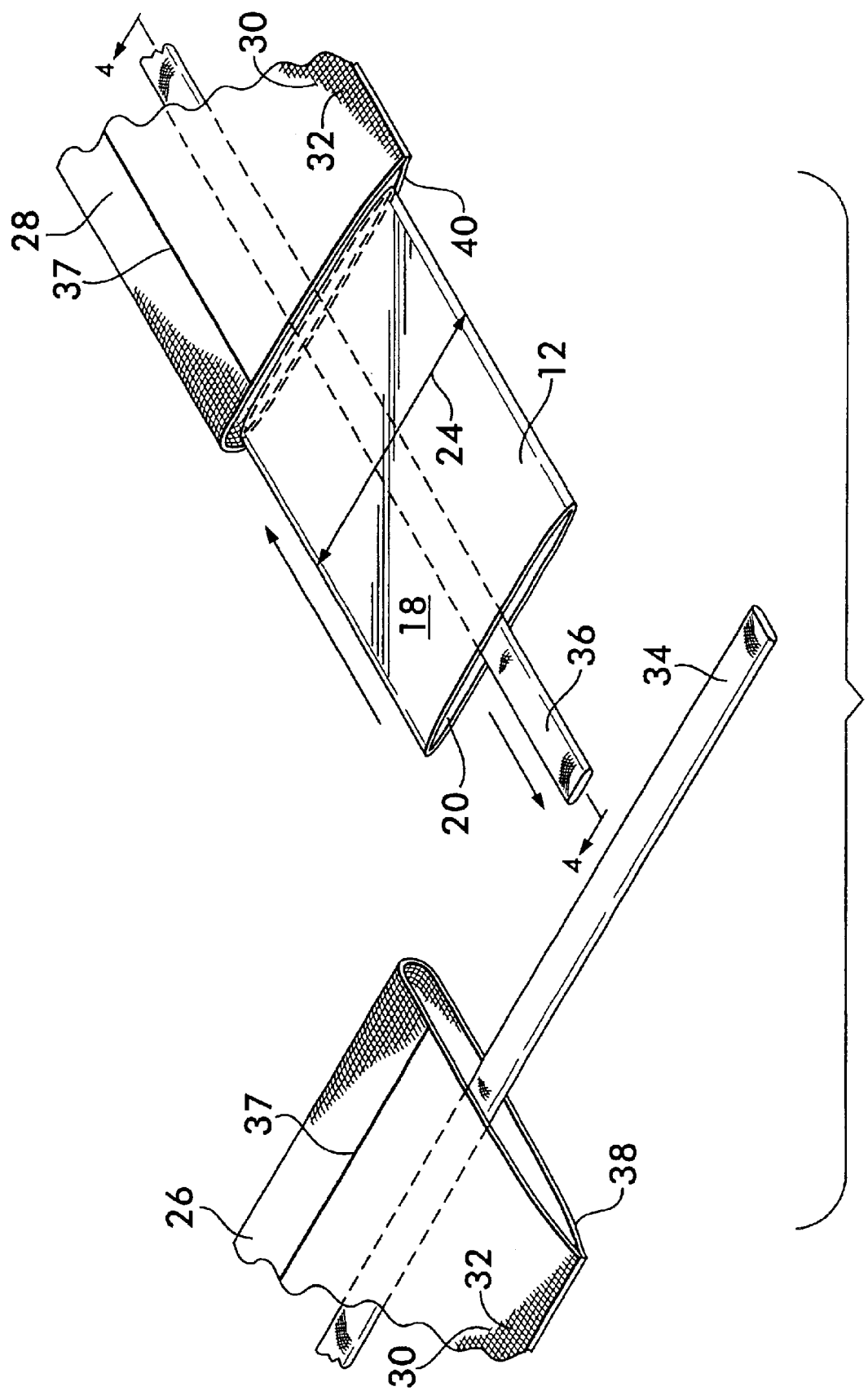

In making the splice, as shown in FIG. 2, it is preferred to first trim the ends 38 and 40, making them square and eliminating frayed or unraveled filaments that may snag an elongated item or pull tape being drawn through the protective sleeve after installation in a duct. Next, as shown in FIG. 3, the release liner 12 is inserted into one of the sleeve ends, for example, end 40. The preferred form of liner 12 is tube 20 which is folded flat to conform to the flat configuration of sleeves 26 and 28. When folded, the tube 20 has width 24 sized to fit within and substantially fill the sleeve segments 26 and 28. As best shown in FIG. 4, the tube 20 surrounds the pull tape 36 and is positioned between it and the inner surface 42 of sleeve segment 28. The tube 20 is preferably about 6 inches long and is inserted into end 40 with about 1 inch extending out from the sleeve segment as shown in FIG. 5.

Figure 6:
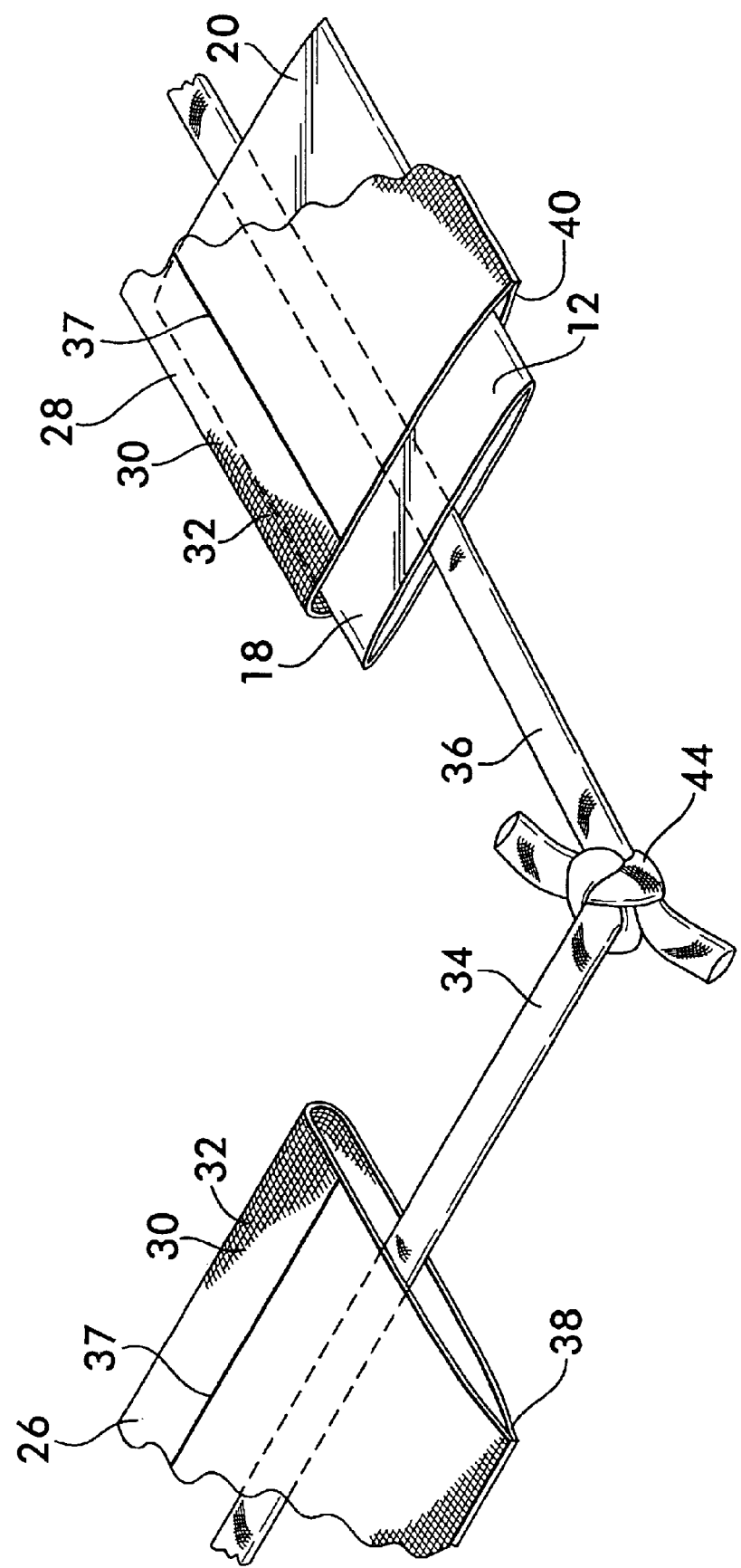

Next, as shown in FIG. 6, pull tape 36 is joined to pull tape 34 to ensure continuity of the pull tapes through the spliced sleeve segments 26 and 28. Joining of the tapes is preferably effected by a knot 44, preferably a "fisherman's knot" or a "double blood knot".

Figure 7:
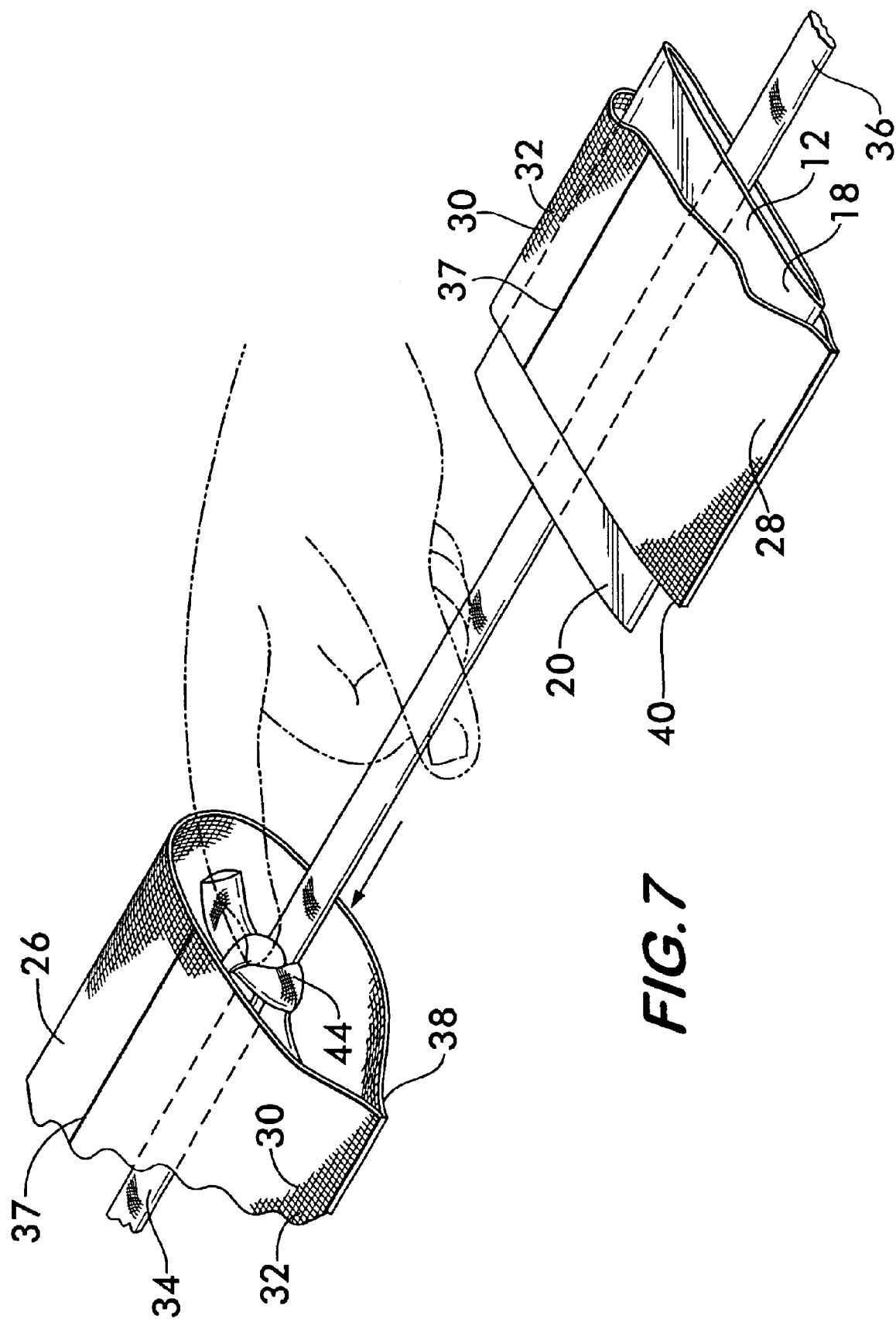
Figure 8:
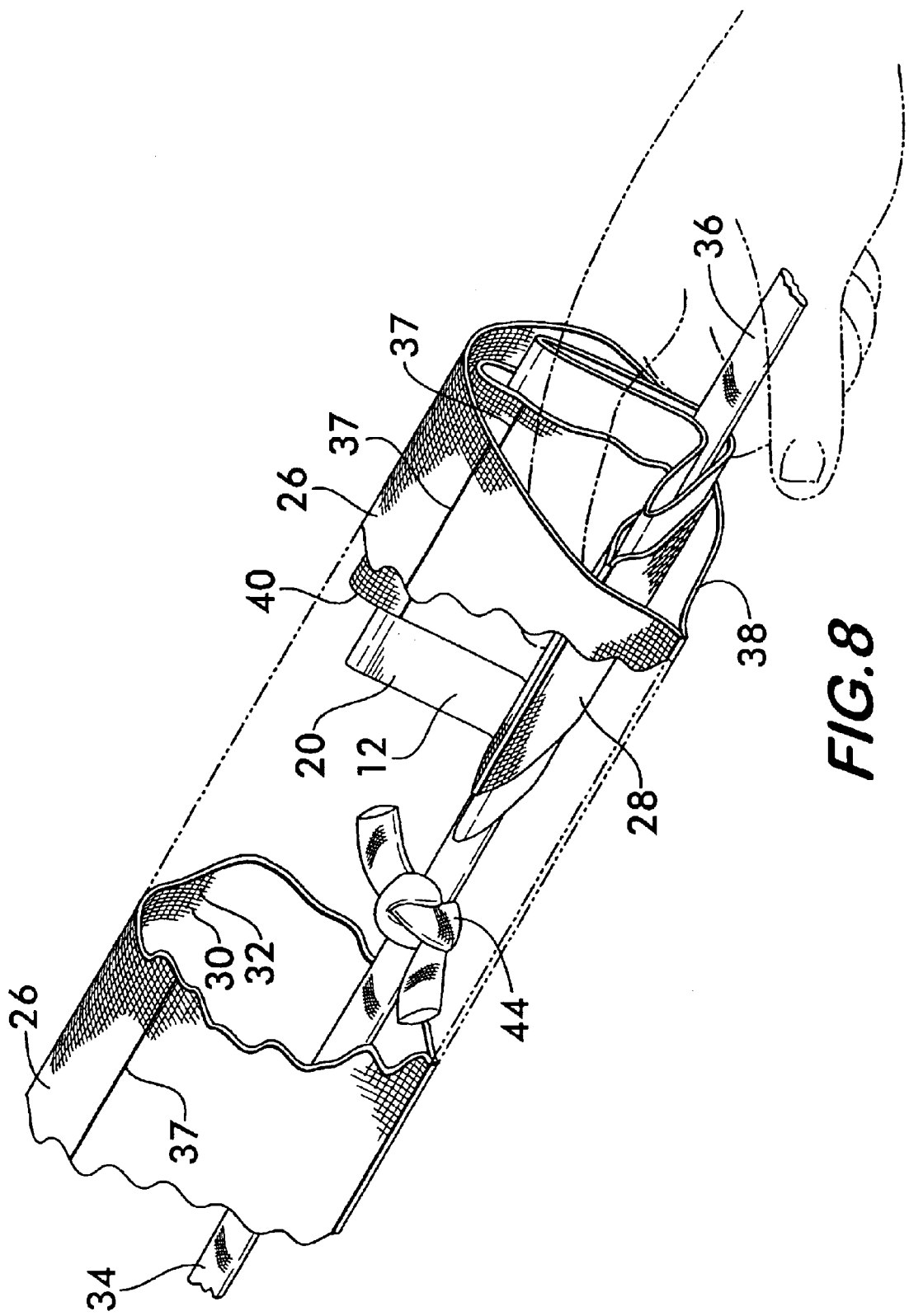

Preparations are now made to insert end 40 of sleeve segment 28 into end 38 of sleeve segment 26. Before insertion, as shown in FIG. 7, care is taken to ensure that the knot 44 joining the pull tapes 34 and 36 is inserted deep into segment 26 so as not to interfere with the subsequent splicing operations. As shown in FIG. 8, end 40 of sleeve segment 28 is then inserted into end 38 of segment 26. Care is taken at this step to align the visible identifiers 37 with one another and ensure that their identifying features, such as color, are the same. The two sleeve segments initially engage one another over a length of about six inches.

Figure 9:
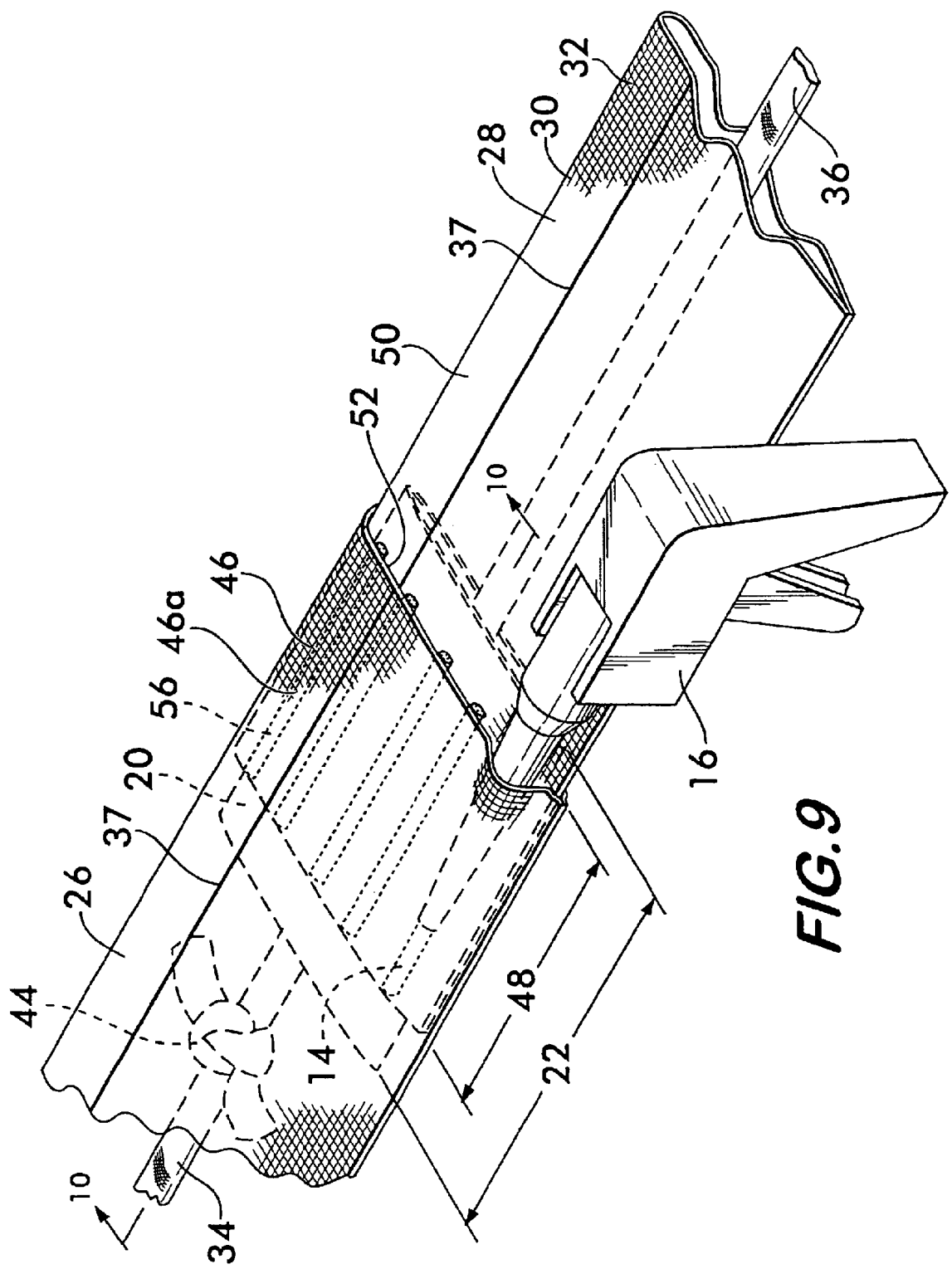

After the initial insertion of the segment end 40 into segment end 38, the segments 26 and 28 are drawn away from one another so that they engage each other over an engagement zone 46, shown in FIG. 9. The engagement zone 46 has a predetermined length 48 of about 3 to 3.5 inches. The drawing away of the segments allows the tube 20 to be arranged flat within them and establishes the engagement zone 46. Preferably, the length 22 of tube 20 is such that the tube extends about an inch beyond either side of engagement zone 46. In the engagement zone, as best shown in FIG. 10, the outer surface 50 of sleeve segment 28 engages the inner surface 52 of sleeve segment 26 and the tube 20 engages the inner surface 42 of sleeve segment 28.

Figure 9A:
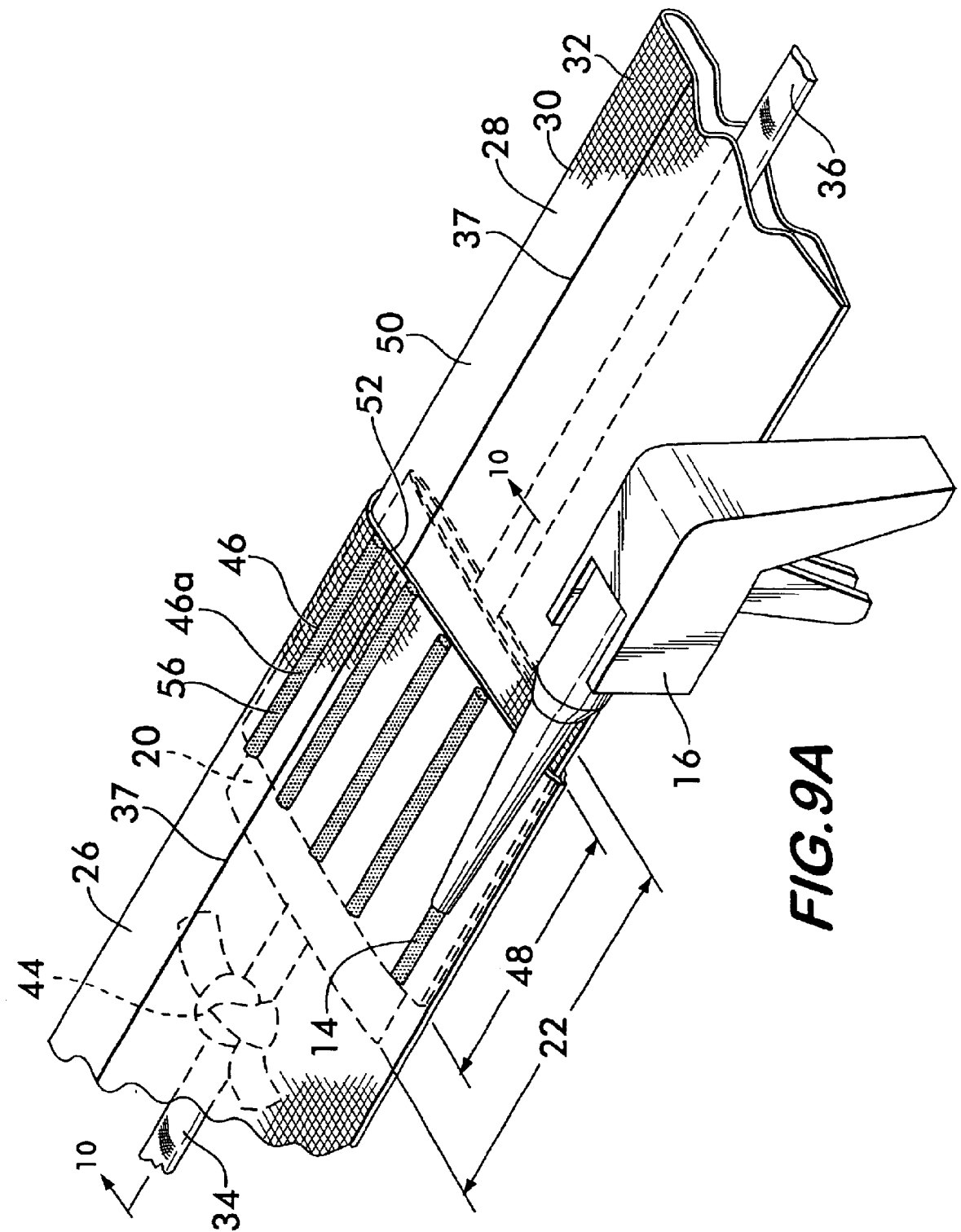

With reference again to FIG. 9, the adhesive applicator 16 is next used to apply adhesive 14 between the sleeves 26 and 28 throughout the engagement zone 46 over a region 46a overlying the tube 20. The adhesive adheres the first and second sleeves to one another but does not penetrate the non-porous membrane that comprises tube 20. The preferred adhesive is a two-part acrylic epoxy that provides the advantages of quick curing at room temperature, post-cure flexibility, high bonding strength and inertness to various fluids. Polyethylene vinyl acetate hot melt adhesives are also feasible. In an alternate method step, illustrated in FIG. 9A, the adhesive 14 may be applied directly to the outer surface of sleeve 26. The adhesive 14 penetrates the sleeve 26 and adheres it to sleeve 28.

Figure 12:
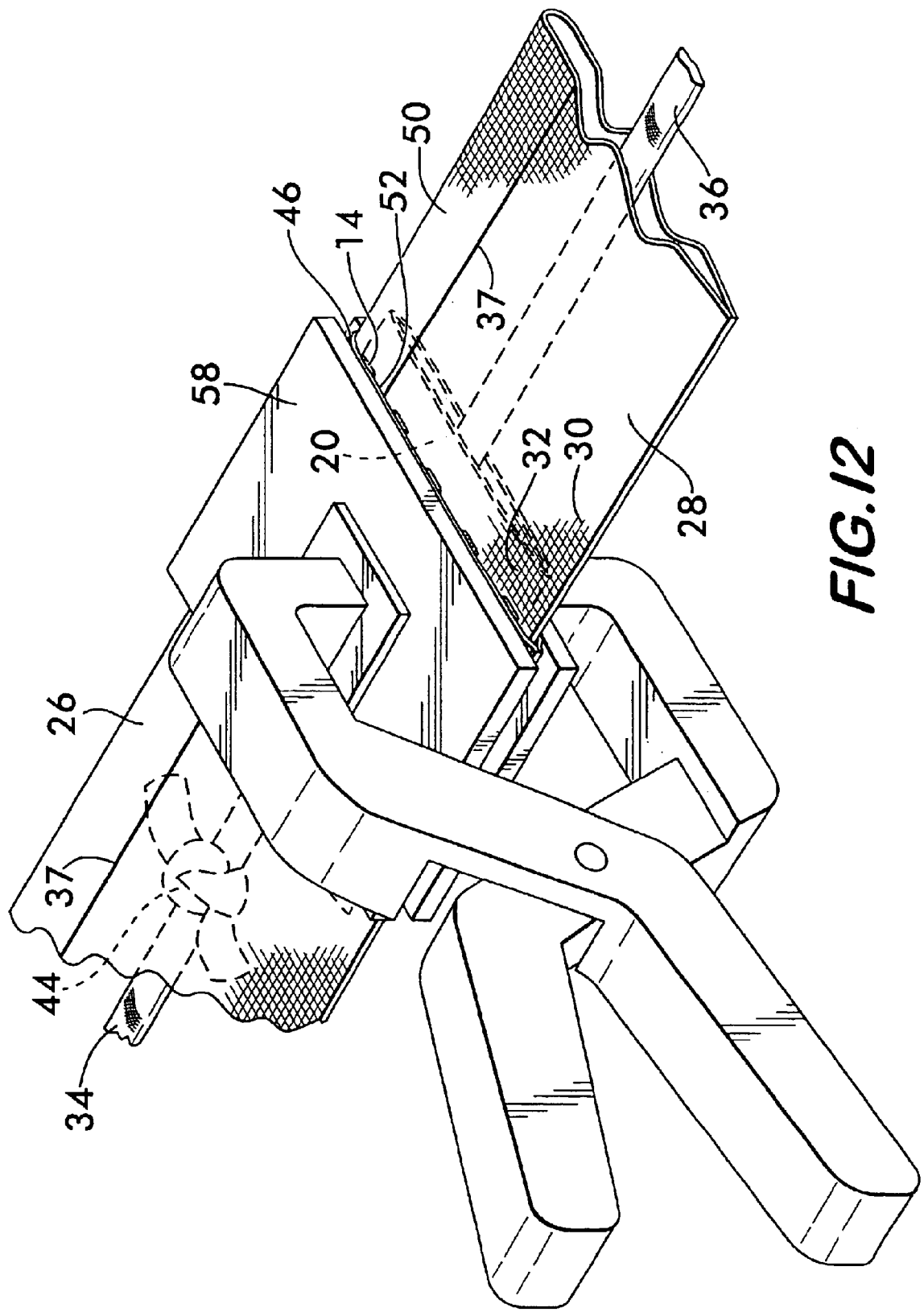

The adhesive is preferably confined to the region 46a of engagement zone 46 and is applied between the sleeve segments in a plurality of stripes 56 on both sides of the flattened sleeve segment 28 as shown in FIG. 11. Stripes 56 are preferably parallel and oriented lengthwise along the sleeve segments. This orientation allows the sleeve segments to remain expandable and flexible at the splice. Care must be taken not to apply adhesive beyond the extent of the tube 20 (see FIG. 9) to avoid bonding either sleeve segment closed. Due to the porous nature of the sleeve segments, adhesive 14 flows between them and bonds sleeve segment 26 to sleeve segment 28 over the region 46a of engagement zone 46. To facilitate distribution of the adhesive between the sleeve segments and engagement of the sleeve surfaces, it is advantageous to apply pressure over the engagement region. This is conveniently accomplished by a clamp 58 as shown in FIG. 12. Since the adhesive is confined to the region 46a of engagement zone 46, it is prevented from penetrating entirely through the sleeve segment 28 by the tube 20, which acts as a barrier and prevents the adhesive from bonding the sleeve segments 26 or 28 closed. The adhesive only adheres the sleeve segments to one another.

After the adhesive cures, as shown in FIG. 13, the clamp 58 may be removed and the pull through the duct of the protective sleeve, now comprising sleeve segments 26 and 28, may be resumed.

The splicing kit and the method according to the invention provide a way of reliably forming strong sleeve splices in the field which ensure that the spliced sleeves will remain open at the splice and permit the eventual insertion of elongated items within the protective sleeves.

What is claimed is:

1. A kit for adhesively splicing porous sleeves together end to end using a flowable adhesive, a portion of one end of one sleeve being positioned within one end of a second sleeve, an outer surface of said one sleeve being engaged with an inner surface of said second sleeve over a predetermined length, said adhesive bonding said sleeves to one another substantially within a zone defined by said predetermined length to effect said splice, said kit comprising a non-porous, flexible membrane, said membrane being positionable within said one sleeve and extending substantially over said predetermined length, said membrane serving as a barrier to prevent said adhesive from penetrating through said one sleeve.

2. A kit according to claim 1, wherein said membrane comprises an elongated tube sized to fit substantially within said one sleeve.

3. A kit according to claim 2, wherein said elongated tube has a length greater than said predetermined length.

4. A kit according to claim 1, wherein said membrane is comprised of a synthetic resin.

5. A kit according to claim 1, wherein said membrane is comprised of polyethylene terepthalate.

6. A kit according to claim 1, further comprising said flowable adhesive.

7. A kit according to claim 6, further comprising an adhesive applicator.

8. A method of splicing an end of a first porous sleeve to an end of a second porous sleeve, said method comprising the steps of:

providing a non-porous membrane;

inserting said membrane within said end of said first porous sleeve;

inserting said end of said first porous sleeve within said end of said second porous sleeve thereby engaging an outer surface of said first sleeve with an inner surface of said second sleeve in a zone extending over a predetermined length; and applying adhesive between said first and second sleeves throughout said zone over a region overlying said membrane, said adhesive adhering said first and second sleeves to one another, said adhesive not penetrating said non-porous membrane.

9. A method according to claim 8, further including the step of applying pressure over said region.

10. A method according to claim 8, wherein a first pull tape is positioned within said first sleeve and a second pull tape is positioned within said second sleeve, said method further including the steps of:

joining said first pull tape to said second pull tape; and positioning said membrane between at least one of said pull tapes and said region over which adhesive is applied.

11. A method according to claim 8, further including the step of cutting said ends of said first and said second sleeves before said inserting step.

12. A method according to claim 8, wherein said first and second sleeves each have a visible identifier extending lengthwise therealong, said method further including the step of aligning said identifier on said first sleeve with said identifier on said second sleeve.

13. A protective sleeve comprising:

a first segment formed of a plurality of interlaced filamentary members, said first segment having a first open end;

a non-porous, flexible membrane positioned within said first open end;

a second segment formed of a plurality of interlaced filamentary members, said second segment having a second open end, said first open end being positioned within said second open end such that an outwardly facing surface of said first segment engages an inwardly facing surface of said second segment over a predetermined length of said segments; and an adhesive deposited between said outwardly and said inwardly facing surfaces, said adhesive being confined to a region defined by said membrane, said adhesive bonding said segments to one another.

14. A protective sleeve according to claim 13, wherein said filamentary members are interlaced by weaving.

15. A protective sleeve according to claim 13, wherein said filamentary members comprise monofilaments.

16. A protective sleeve according to claim 13, wherein said filamentary members are formed from a material selected from the group consisting of nylon, polyester, polyethylene, polypropylene and polytetrafluoroethylene.

17. A protective sleeve according to claim 13, wherein said membrane comprises an elongated tube positioned substantially coaxially within said first segment.

18. A protective sleeve according to claim 17, wherein said elongated tube has a length greater than said predetermined length.

19. A method of splicing an end of a first porous sleeve to an end of a second porous sleeve, said method comprising the steps of:

providing a non-porous membrane;

inserting said membrane within said end of said first porous sleeve;

inserting said end of said first porous sleeve within said end of said second porous sleeve thereby engaging an outer surface of said first sleeve with an inner surface of said second sleeve in a zone extending over a predetermined length; and applying adhesive to said outer surface of said second sleeve throughout said zone over a region overlying said membrane, said adhesive penetrating said second sleeve and adhering said first and second sleeves to one another, said adhesive not penetrating said non-porous membrane.

20. A method according to claim 19, further including the step of applying pressure over said region.

* * * * *